(12) United States Patent
Bowe et al.

(10) Patent No.: US 11,914,382 B2
(45) Date of Patent: Feb. 27, 2024

(54) SYSTEMS AND METHODS FOR OVERLAP-AWARE RANKING OF NAVIGATION AVOIDANCE AREAS FOR AUTONOMOUS VEHICLES

(71) Applicant: GM Cruise Holdings, LLC, San Francisco, CA (US)

(72) Inventors: Alexander John Bowe, San Francisco, CA (US); Lucio Otavio Marchioro Rech, San Mateo, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/698,990

(22) Filed: Mar. 18, 2022

(65) Prior Publication Data
US 2022/0206504 A1 Jun. 30, 2022

Related U.S. Application Data

(63) Continuation of application No. 16/457,986, filed on Jun. 29, 2019, now Pat. No. 11,307,590.

(51) Int. Cl.
| | |
|---|---|
| *G05D 1/02* | (2020.01) |
| *G05D 1/00* | (2006.01) |
| *G01C 21/34* | (2006.01) |
| *G06F 16/29* | (2019.01) |
| *G06F 16/2457* | (2019.01) |

(52) U.S. Cl.
CPC ....... *G05D 1/0214* (2013.01); *G01C 21/3461* (2013.01); *G05D 1/0088* (2013.01); *G05D 1/0274* (2013.01); *G06F 16/24578* (2019.01); *G06F 16/29* (2019.01); *G05D 2201/0213* (2013.01)

(58) Field of Classification Search
None
See application file for complete search history.

(56) References Cited

U.S. PATENT DOCUMENTS

| | | |
|---|---|---|
| 8,509,982 B2 | 8/2013 | Montemerio et al. |
| 9,188,985 B1 | 11/2015 | Hobbs et al. |
| 9,587,952 B1 | 3/2017 | Slusar |

(Continued)

OTHER PUBLICATIONS

"Office Action for U.S. Appl. No. 16/457,986", dated Jun. 14, 2021, 16 pages.

(Continued)

*Primary Examiner* — Tamara L Weber
(74) *Attorney, Agent, or Firm* — Calfee, Halter & Griswold LLP

(57) ABSTRACT

A computing system that analyzes the network effects of avoidance areas on autonomous vehicle routing is described herein. The computing system includes a data store that comprises a set of avoidance areas through which the autonomous vehicle is prohibited from being routed. A grouping system identifies groups of avoidance areas. A graph construction system constructs a graph representation of the avoidance area groups. A ranking algorithm is evaluated over the graph representation to generate a ranking of the avoidance area groups by relative impact on routing metrics for routes through an operational area of the autonomous vehicle. A mapping vehicle can be dispatched to resolve avoidance areas in avoidance area groups indicating in the ranking as having a greater impact on routing metrics than other avoidance area groups.

20 Claims, 8 Drawing Sheets

(56) References Cited

U.S. PATENT DOCUMENTS

| | | | |
|---|---|---|---|
| 11,017,674 | B1 | 5/2021 | Patterson et al. |
| 2009/0088916 | A1 | 4/2009 | Elgersma et al. |
| 2015/0166072 | A1 | 6/2015 | Powers et al. |
| 2017/0192437 | A1 | 7/2017 | Bier et al. |
| 2020/0409375 | A1 | 12/2020 | Bowe et al. |

OTHER PUBLICATIONS

"Response to the Office Action for U.S. Appl. No. 16/457,986", filed Sep. 14, 2021, 10 pages.
"Notice of Allowance and Fees Due for U.S. Appl. No. 16/457,986", dated Dec. 22, 2021, 5 pages.

SYSTEMS AND METHODS FOR OVERLAP-AWARE RANKING OF NAVIGATION AVOIDANCE AREAS FOR AUTONOMOUS VEHICLES

RELATED APPLICATIONS

This application is a continuation of U.S. patent application Ser. No. 16/457,986, filed on Jun. 29, 2019 and entitled "SYSTEMS AND METHODS FOR OVERLAP-AWARE RANKING OF NAVIGATION AVOIDANCE AREAS FOR AUTONOMOUS VEHICLES," the entirety of which is incorporated herein by reference.

BACKGROUND

An autonomous vehicle is a motorized vehicle that can navigate from a first location to a second location without a human driver. For example, the autonomous vehicle may include a routing system that generates a travel route based upon information obtained from a high definition (HD) map. A localization system of the autonomous vehicle further relies upon the HD map to determine where the autonomous vehicle is located, in three-dimensional space, so that the travel route generated by the routing system can be executed. Such maps are typically created from lidar data and image data collected from navigating multiple vehicles/multiple times along a same roadway and aggregating the data. The more data that is collected for the HD map, the more precise the map may become.

While HD maps can provide an accurate representation of a given environment, certain aspects of the environment do not always remain static. For instance, repainted road lines, new traffic lights, newly installed signage, and other modifiable features such as crosswalks and road geometry can compromise the integrity of an HD map and, by extension, the ability of an autonomous vehicle to navigate safely about the roadways. Thus, when inconsistencies with the HD map are detected in an environment, a geographic area including the inconsistency may be flagged on the HD map as an avoidance area through which the autonomous vehicle is prohibited from being routed.

Problematically for large scale mapping operations (e.g., maps created for an entire city) is that the rate at which avoidance areas are established may occur faster than the rate at which the avoidance areas can be remapped from newly collected lidar data and image data. When enough avoidance areas are specified on the HD map, a routing system for the autonomous vehicle may generate a route that, for example, is longer than an optimal length, requires more costly fares, and/or includes navigational inconveniences that could otherwise be averted by a human driver. Since not all avoidance areas have the same network effects on autonomous vehicle routing, determining a particular order to remap the avoidance areas is oftentimes more beneficial than selecting avoidance areas at random to remap. Unfortunately, statistical approaches for prioritizing the order in which avoidance areas should be remapped are computationally cumbersome and are typically impractical to implement in large scale mapping operations.

SUMMARY

The following is a brief summary of subject matter that is described in greater detail herein. This summary is not intended to be limiting as to the scope of the claims.

Described herein are various technologies pertaining to analysis of network effects of avoidance areas on routing. With more specificity, described herein is a computing system that identifies one or more avoidance areas to remove from a set of avoidance areas specified on a map based upon remapping the one or more avoidance areas in an order that desirably improves the network effects on autonomous vehicle routing. Network effects refers to the collective impact that the one or more avoidance areas have on an efficiency of a given route from an origin location to a destination location.

With still more specificity, described herein is a computing system that includes a data store that stores a map relating to an operational area (e.g., a neighborhood, a city, a metropolitan region, etc.), wherein the map includes positions of roads in the operational area and a set of avoidance areas. The computing system is configured to generate a ranking of avoidance area groups, wherein the ranking is indicative of an ordering of avoidance area groups according to their impact on routing metrics (e.g., time, distance, cost) for a set of routes through the operational area represented by the map. The ranking therefore indicates an order in which avoidance area groups can be resolved to more efficiently improve trip routing metrics using limited resources for resolving avoidance areas (e.g., as compared with random selection of avoidance areas to resolve). Stated differently, the computing system can be configured to identify avoidance areas on the map that have a disproportionate impact on routing metrics across a plurality of potential routes, such as length of route, cost of route, estimated time of arrival, etc., so that resources needed to remap/resolve such avoidance areas can be prioritized accordingly.

The computing system identifies avoidance area groups based upon the avoidance areas identified in the map. Avoidance areas in an avoidance area group can typically be based upon a same root cause, situated close to each other, and often can include similar timestamps (e.g., minimal or no additional effort may be needed to resolve avoidance areas in the group compared to resolving just one of the avoidance areas in such group). In an exemplary embodiment, the computing system assigns avoidance areas to groups based upon proximity of avoidance areas to one another, or physical overlap of the avoidance areas. In another exemplary embodiment, the computing system assigns avoidance areas to groups based upon a set of potential routes through the operational area. By way of example, the computing system generates a potential route from an origin location to a destination location and detects one or more avoidance areas that lie along the initial route based upon the map. The computing system assigns the one or more detected avoidance areas to an avoidance area group. The computing system can repeat the generating, detecting, and assigning for a plurality of routes through the operational area represented by the map. In still further exemplary embodiments, the computing system assigns avoidance areas to groups based upon proximity or overlap of the avoidance areas and the set of potential routes. For example, the computing system can be configured to assign avoidance areas to a same group only when avoidance areas are within a threshold distance of one another along a same route in the set of potential routes.

The computing system generates an impact ranking of avoidance area groups based upon recursively evaluating relative impact of each of the groups with respect to a set of potential trips through the operational area. In some cases there will be partial overlap between avoidance area groups.

Stated differently, a first avoidance area group can include avoidance areas that are also included in a second avoidance area group. Accordingly, the impact of an avoidance area group on routing metrics for trips through the operational area is dependent on the impact of other avoidance area groups and a degree of overlap between the avoidance area group and other avoidance area groups. In order to account for the effects of overlap between avoidance area groups, the impact of each of the avoidance area groups is evaluated recursively.

The computing system generates a graph representation of the avoidance area groups. The graph representation of the avoidance area groups includes vertices that each represents a respective avoidance area group represented in the map. The graph further includes edges that each connect a respective pair of vertices. The vertices of the graph are assigned initial weights that are indicative of a naïve impact of the avoidance area group represented by each vertex with respect to a set of potential routes (e.g., without consideration of network effects among avoidance area groups). Each of the edges of the graph is assigned a weight based upon a number of shared avoidance areas between the avoidance area groups represented by the vertices that are connected by the edge.

The computing system generates an impact ranking of the avoidance area groups by executing a recursive influence evaluation algorithm over the graph representation of the avoidance area groups. By way of example, and not limitation, the computing system generates the impact ranking of the avoidance area groups by executing a PageRank algorithm over the graph. In the example, the impact ranking can be a listing of vertices, or associated avoidance area groups, and corresponding PageRank values. In exemplary embodiments, the computing system can be configured to update an impact ranking periodically or based upon additional avoidance areas being added to or removed from the map (e.g., responsive to a condition giving rise to an avoidance area being resolved). Accordingly, the impact ranking can comprise a list of tuples indicating a date or timestamp, an avoidance area group identifier, and an associated PageRank value.

In some embodiments, the impact ranking is used in connection with dispatching resources to resolve conditions giving rise to avoidance areas. In a non-limiting example, the computing system can be or be included in a system that issues instructions to autonomous mapping vehicles in the operational area represented by the map. The computing system can transmit an instruction to an autonomous mapping vehicle that causes the mapping vehicle to navigate to an avoidance area indicated in the map. Upon arrival at the avoidance area, the mapping vehicle initiates a mapping operation to gather data pertaining to the avoidance area (e.g., lidar data, image data, radar data, etc.). The map of the operational area can be updated based upon the data gathered by the mapping vehicle, wherein the updates to the map can enable safe operation of autonomous vehicles in the avoidance area. The avoidance area can subsequently be indicated in the map as being resolved (e.g., by labeling the avoidance area "resolved" or removing the avoidance area from a listing of avoidance areas in the map), such that autonomous vehicles navigating through the operational area can be routed through the avoidance area. By identifying avoidance area groups having a highest impact while taking into consideration network effects and overlap between avoidance area groups, the computing system can enable avoidance area groups to be more efficiently resolved given a fixed amount of available mapping resources (e.g., autonomous mapping vehicles).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
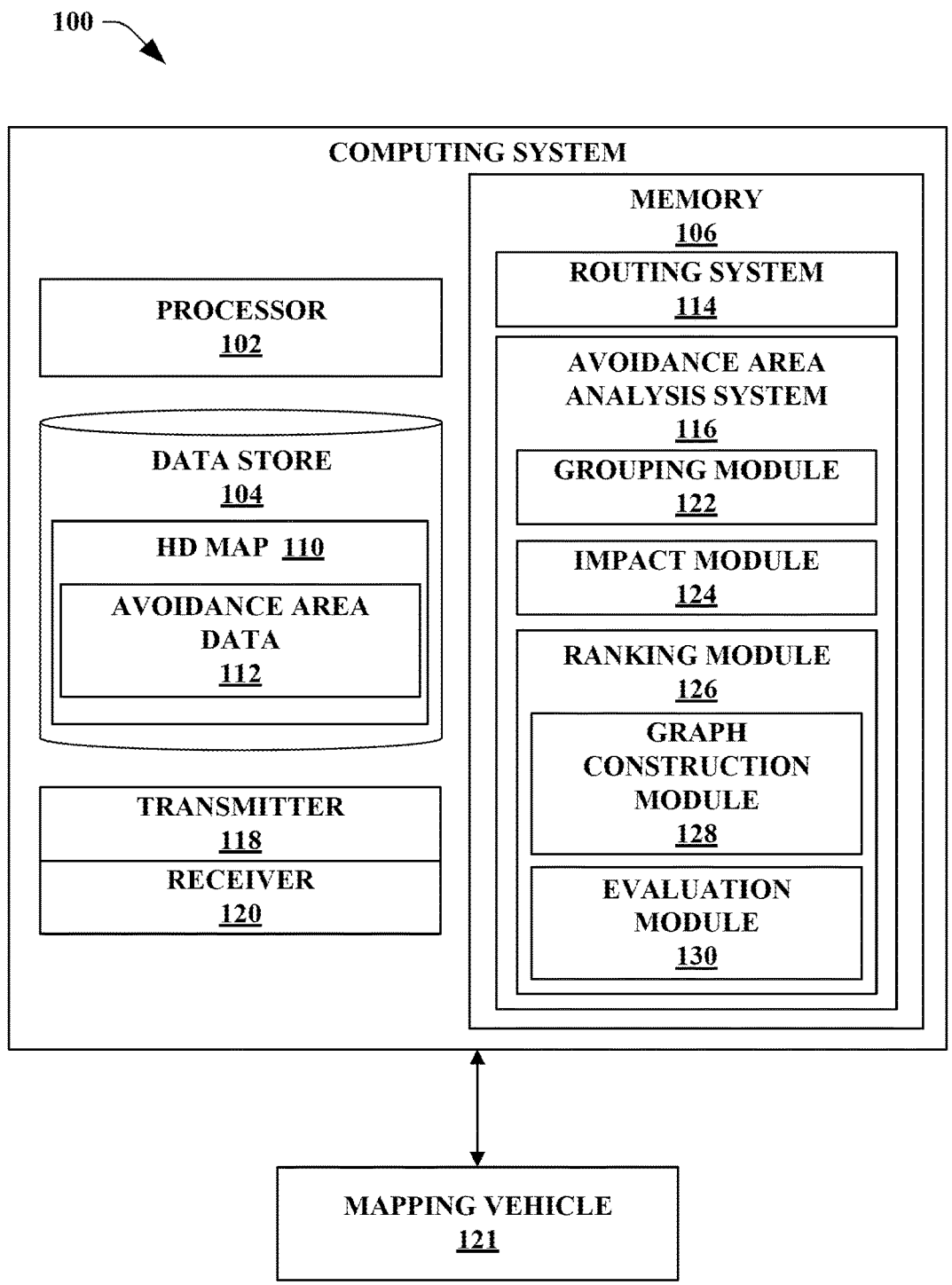
FIG. 1 illustrates an exemplary computing system for generating a ranking of avoidance area groups based on effects on trip routing metrics.

Various technologies pertaining to analysis of network effects of avoidance area groups on routing is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Further, as used herein, the terms "module" and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, an "initial route" is a route that is generated from a source location to a target location irrespective of avoidance areas. An "alternative route" is a route that circumvents at least one avoidance area located on an initial route. Further, as used herein, the term "exemplary" is intended to mean serving as an illustration or example of something and is not intended to indicate a preference.

With reference now to FIG. 1, an exemplary computing system 100 that is configured to determine a ranking of avoidance area groups according to priority of resolution is illustrated. With more particularity, the computing system 100 is configured to determine a relative impact of avoidance area groups on routing metrics for a set of routes through an operational area of an autonomous vehicle, wherein the relative impact is determined based upon overlap of avoidance areas between avoidance area groups.

The computing system 100 comprises a processor 102 and memory 106 that stores computer-executable instructions that are executed by the processor 102 to cause the processor 102 to perform acts in accordance therewith. The computing system 100 further comprises a data store 108 that stores an HD map 110 of an operational area of the autonomous vehicle. The HD map 110 can include data pertaining to navigation of an autonomous vehicle through the operational area such as two- or three-dimensional positions of roadways, lane boundaries, and buildings or other obstructions, the presence and/or positions of navigationally relevant objects such as traffic signals and/or signage, road condition information, or the like. The HD map 110 can further include avoidance area data 112 that is indicative of regions of the operational area through which the autonomous vehicle is prevented from being routed.

An avoidance area indicated in the avoidance area data 112 can be identified based upon inconsistencies between currently retained map data and environmental data that is generated based upon a sensor signal that is representative of an environment. By way of example, an avoidance area can be identified based upon an inconsistency between a roadway boundary indicated in the HD map 110 and a roadway boundary indicated by sensors included on an autonomous vehicle traveling along the roadway. Avoidance areas can be identified based upon several such inconsistencies that share a same root cause, are situated close to each other, or include similar timestamps (e.g., corresponding to times at which the inconsistencies were detected), wherein minimal or no additional effort is required to remap/resolve all of the inconsistencies in the area as opposed to remapping/resolving just one of the inconsistencies. By way of example, a plurality of inconsistencies being identified within a same intersection on a same day can result in a region encompassing the intersection being labeled as an avoidance area in the avoidance area data 112.

Memory 106 can include a routing system 114 and an avoidance area analysis system 116. The routing system 114 can generate one or more routes from an origin location to a destination location in the operational area represented by the map 110 based upon metrics such as minimizing a travel time, distance, and/or cost of a route. The generated route may pass through one or more avoidance areas. However, the routing system 114 typically generates routes that circumvent avoidance areas when generating routes to be traversed by autonomous vehicles. In an exemplary embodiment, the one or more routes are generated based upon a predefined processing time constraint which specifies a timeframe for the processor 102 to generate the one or more routes.

A transmitter 118 and a receiver 120, which may be configured as a single transceiver, are disposed in the exemplary computing system 100 to establish communication with other devices. For example, the receiver 120 may receive lidar data and camera data that include new or updated avoidance area data 112 collected from continued mapping operations (e.g., as performed by one or more autonomous mapping vehicles). The transmitter 118 is configured to transmit data, such as avoidance areas that are desirably removed from a set of avoidance areas included in the avoidance area data 112, to other devices and/or sources configured to collect information for resolving avoidance areas on the map. By way of example, the transmitter 118 can transmit a dispatching command to a mapping vehicle 121 that causes the mapping vehicle 121 to navigate to the location of an avoidance area and to perform a mapping operation wherein the mapping vehicle 121 to obtain sensor data pertaining to the avoidance area.

The avoidance area analysis system 116 is configured to generate impact data that is indicative of relative impact of avoidance area groups on routing metrics for a set of trips through the operational area represented by the HD map 110. Stated differently, the avoidance area analysis system 116 identifies which avoidance area groups indicated in the avoidance area data 112, if resolved (e.g., by remapping), would have a greater impact on one or more routing metrics over a set of trips than other avoidance area groups. In one exemplary embodiment, the avoidance area analysis system 116 outputs an impact ranking comprising an ordered list of avoidance area groups and corresponding impact rank values. The avoidance area analysis system 116 generates the impact data based upon a graph representation of avoidance area groups in the HD map 110 that includes data indicative of overlap between avoidance area groups, as will be described in greater detail below.

Figure 2:
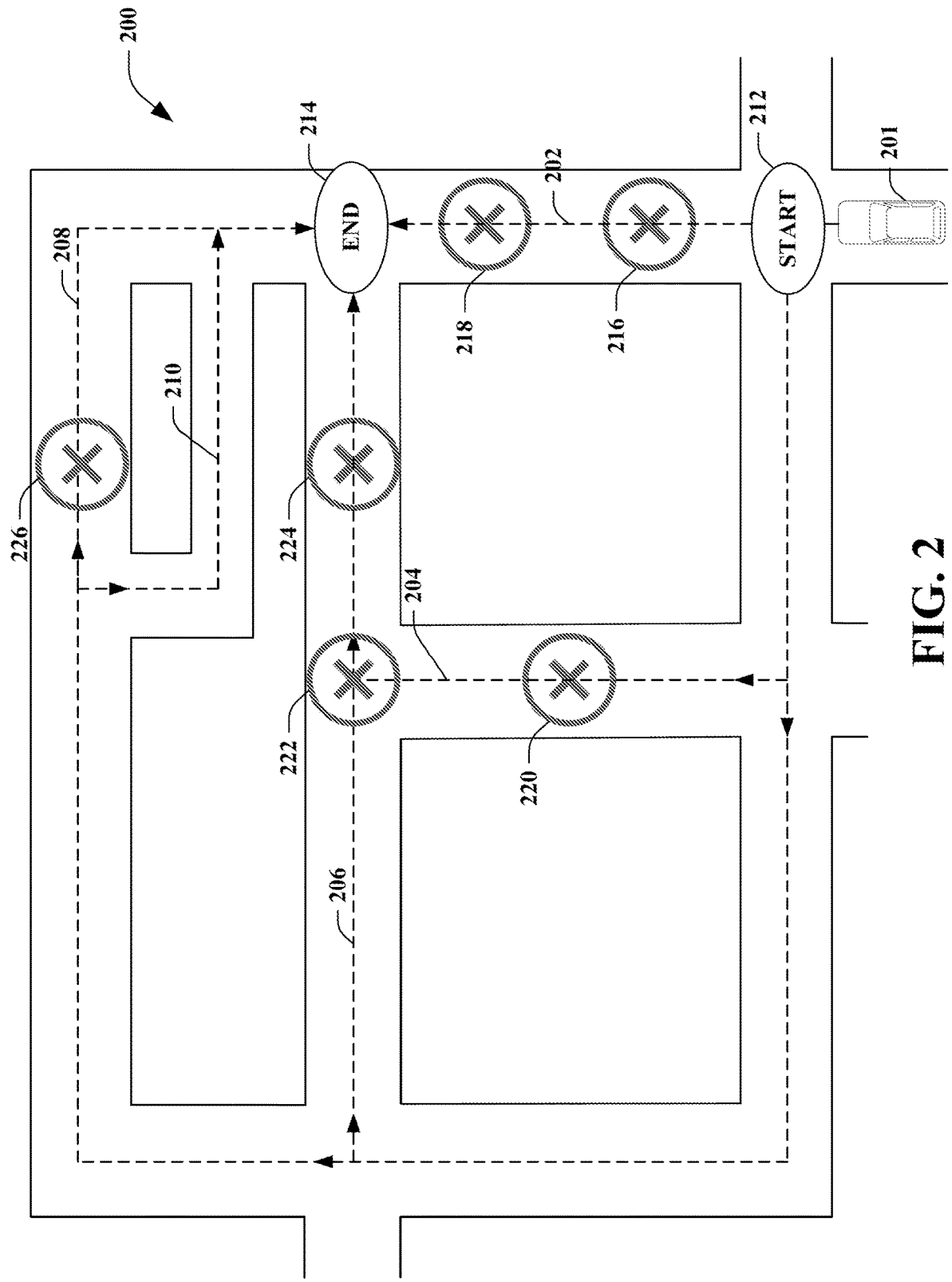
FIG. 2 illustrates an exemplary operational area for autonomous vehicles.

The presence of avoidance areas in an operational area of an autonomous vehicle can have deleterious effects on routing of the autonomous vehicle through the area. With reference now to FIG. 2, an exemplary operational area 200 of an autonomous vehicle 201 is shown, illustrating the effects on routing caused by the presence of avoidance areas in the operational area. A plurality of routes 202-210 through the operational area 200 are indicated, each of the routes beginning at an origin location 212 and ending at a destination location 214. In an example, a first route 202 can be considered an "ideal" route (e.g., a fastest route, a shortest route, or a least expensive route) from the origin location 212 to the destination location 214. In many operational environments, however, an ideal route from an origin to a destination may be obstructed by one or more avoidance areas that cause routing of an autonomous vehicle to be diverted along a different route. By way of example, the operational area 200 can include a plurality of avoidance areas 216-226 that cause routing of the autonomous vehicle to be diverted along other routes (e.g., the routes 204-210).

In the presence of all of the avoidance areas 216-226, the route 210 is the best available route from the origin 212 to the destination 214. In the exemplary operational area 200, if the avoidance areas 216-226 were not present, route 202 would be the ideal route for the autonomous vehicle 201 to travel from the origin location 218 to the destination location 220.

It is to be understood from FIG. 2 that the impact of each of the avoidance areas 216-226 on routing metrics for a trip from the origin 212 to the destination 214 is dependent on the presence and location of other avoidance areas in the operational area 200. In other words, network effects among the avoidance areas 216-226 affect the relative impact of each of the avoidance areas 216-226 in the operational area. By way of an example, resolving either of the avoidance areas 216 or 218 individually has no significant effect on a routing metric for the autonomous vehicle 201 from the origin 212 to the destination 214. However, resolving both of the avoidance areas 216, 218 can have a large impact on routing metrics for the autonomous vehicle 201 by allowing the autonomous vehicle 201 to be routed along the ideal route 202.

In a further non-limiting example, if only avoidance area 216 is present in the operational area 200, the impact of avoidance area 216 on a routing metric from the trip from the origin 212 to the destination 214 can be considered the difference between the routing metric (e.g., time, distance, or cost) for the ideal route 202 and the next-best route 204. However, if the avoidance area 220, which lies along route 204, is also present in the operational area 200, the joint impact of avoidance areas 216, 220 is the difference between the routing metric for the ideal route 202 and the third-best route 206. If either of the avoidance areas 222, 224 are also present, the joint impact of avoidance areas 216, 220, and 222 or 224 becomes the difference between the routing metric for the ideal route 202 and the fourth-best route 208. In some cases, an avoidance area may have no impact on a routing metric for a trip when other avoidance areas are not present in an operational area. For instance, the avoidance area 226 has no impact on a trip from the origin 212 to the destination if the avoidance areas 216, 218 are not present, or if the avoidance areas 220-224 are not present.

Various exemplary operations of the computing system 100 in connection with generating a ranking of avoidance area groups according to priority of resolution of the avoidance area groups are now described. Referring once again to FIG. 1, the avoidance area analysis system 116 can include a grouping module 122, an impact module 124, and a ranking module 126. The ranking module 126 can further include a graph construction module 128 and an evaluation module 130. In brief, the grouping module 122 assigns each of the avoidance areas indicated in the avoidance area data 112 to one or more groups. The impact module 124 computes an impact of each of the avoidance area groups for a set of one or more routes through the operational area. The ranking module 126 generates a graph representation of the avoidance area groups based upon overlap among the avoidance area groups and the impacts of the groups computed by the impact module 124. The ranking module 126 then generates an overlap-aware impact ranking for each of the avoidance area groups by evaluating a recursive algorithm over the graph representation of the avoidance area groups. These and other operations of the exemplary computing system 100 are described in greater detail below.

Due to network effects among avoidance areas in the operational area defined by the HD map 110, the impact of avoidance areas on routing metrics for trips through the operational area is evaluated based upon groups of avoidance areas. The grouping module 122 is configured to identify a plurality of avoidance area groups based upon avoidance areas indicated in the avoidance area data 112 associated with the HD map 110. In an exemplary embodiment, the grouping module 122 can assign avoidance areas to an avoidance area group based upon the avoidance areas overlapping one another or being within a threshold distance of one another. In such an embodiment, it can be assumed that avoidance areas that are close to one another are likely to have network effects with respect to one another that affect routing of one or more trips through the avoidance areas.

In another exemplary embodiment, the grouping module 122 can assign avoidance areas to an avoidance area group based upon the avoidance areas lying along a trip route generated by the routing system 114. By way of example, the grouping module 122 can receive a set of routes through the operational area from the routing module 114 and assign avoidance areas to groups based upon the set of routes. The set of routes can be a set of routes generated by the routing module 114 for a plurality of corresponding origin-destination pairs, wherein the routes are generated by the routing module 114 without considering the presence of avoidance areas. Stated differently, the routing module 114 can generate the set of routes such that the routes are not constrained to avoid the avoidance areas. Accordingly, the set of routes received by the grouping module 122 will generally be the set of "ideal" routes for each of the origin-destination pairs used to generate the routes. In general, it is impractical to perform analysis over the set of all possible routes through the operational area represented by the HD map 110. In exemplary embodiments, the origin-destination pairs used by the routing module 114 to generate the set of routes can be origin-destination pairs for actual trips taken by users of an autonomous vehicle in communication with the computing device 100 or a set of test origin-destination pairs intended to provide a desired coverage of the operational area represented by the HD map 110.

The grouping module 122 can assign avoidance areas to a same group based upon the avoidance areas lying along a same route in the set of routes received from the routing module 114. For each of the routes in the set of routes received from the routing module 114, the grouping module 122 detects avoidance areas (indicated in the avoidance area data 112) that lie along the route. The grouping module 122 can update the avoidance area data 112 with labeled data indicating that the avoidance areas lying along the route belong to a same avoidance area group. Avoidance areas that do not lie along any of the routes can be assigned to their own respective groups, or alternatively can be ignored as not having an impact on routing metrics for any of the trips. In further embodiments, the grouping module 122 can assign avoidance areas to a same group based upon the avoidance areas lying along a same route in the set of routes and the avoidance areas being within a threshold distance of one another.

Figure 3:
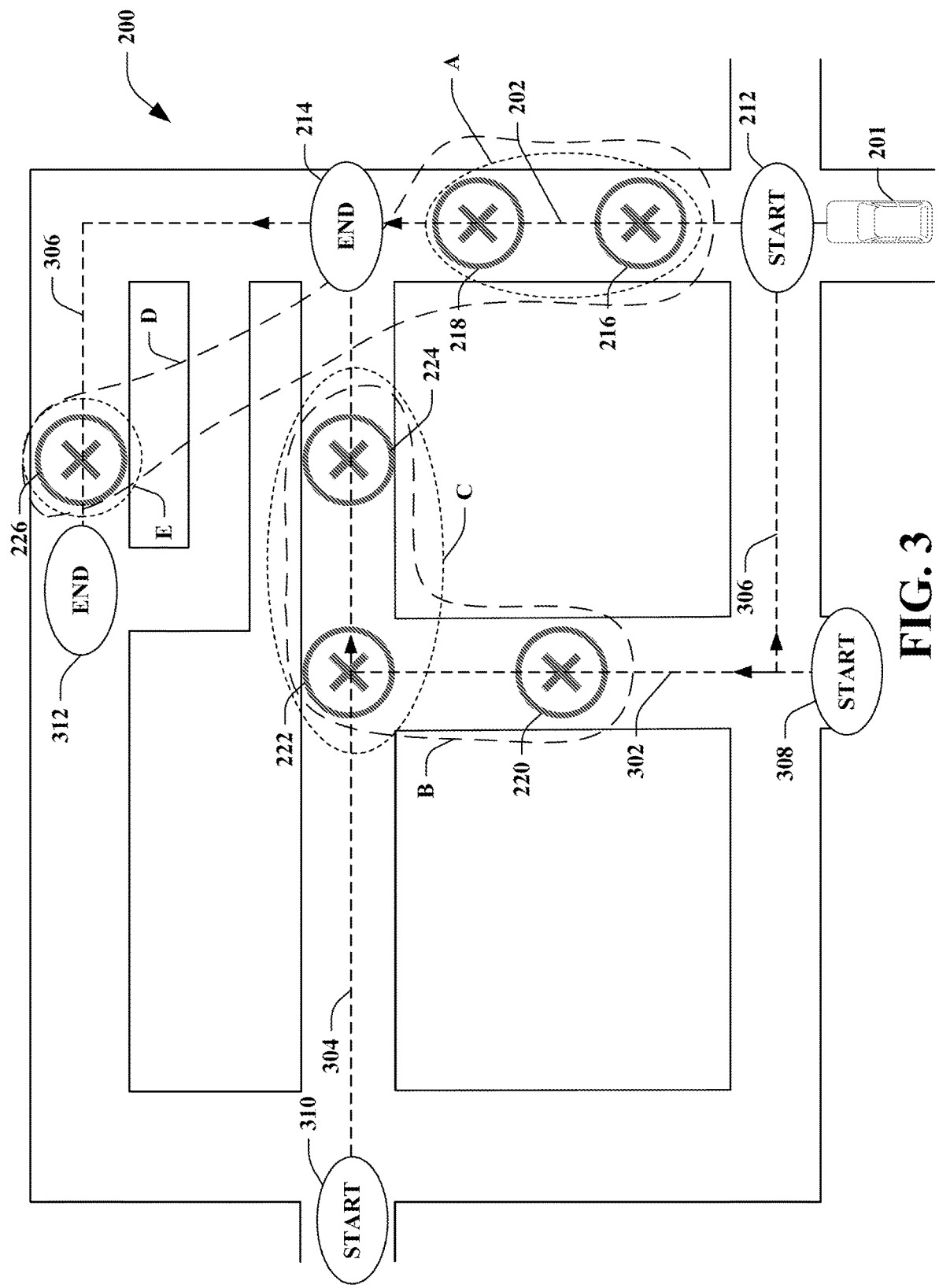
FIG. 3 illustrates exemplary groupings of avoidance areas in the operational area depicted in FIG. 2.

By way of further example, and with reference now to FIG. 3, the exemplary operational area 200 is shown with a set of routes indicated thereon, including the first route 202 and additional routes 302-306. The first route 202 passes through avoidance areas 216 and 218. Second route 302 begins at a second origin location 308 and ends at the first destination 214, passing through avoidance areas 220-224. Third route 304 begins at a third origin location 310 and ends at the first destination 214, passing through avoidance areas 222 and 224. Fourth route 306 begins at the second origin location 308 and ends at a second destination 312, passing through avoidance areas 216, 218, and 226. Accordingly, the grouping module 122 assigns the avoidance areas 216, 218 to a group A that corresponds to the first route 202; the avoidance areas 220, 222, and 224 to a group B that corresponds to the second route 302; the avoidance areas 222 and 224 to a group C that corresponds to the third route 304; and the avoidance areas 216, 218, and 226 to a group D corresponding to the fourth route 306.

The impact module 124 is configured to determine an initial impact of each of the avoidance area groups identified by the grouping module 122 on one or more routing metrics for trips through the operational area, without consideration of overlap between avoidance area groups. In an exemplary embodiment, the impact module 124 computes the initial impact for each of the avoidance area groups based upon an average impact of each avoidance area group on a set of routes through the operational area represented by the HD map 110. In one exemplary embodiment the set of routes used by the impact module 124 to compute the initial impacts of the avoidance area groups can be the same set of routes used by the grouping module 122 to form the avoidance area groups. In another exemplary embodiment, the set of routes used by the impact module 124 to compute the initial impacts can be a different set of routes, e.g., as received from the routing system 114.

By way of example, the impact module 124 can determine, for each route in the set of routes, a route impact score for each of the avoidance area groups. For instance, for each route the impact module 124 can assign a score of zero to avoidance area groups that the route does not pass through. For avoidance area groups that the route does pass through, the impact module 124 can assign an impact score that is based upon the avoidance area group's impact on one or more routing metrics for the route. In a non-limiting example, the impact module 124 can assign an impact score to the avoidance area group that is based upon a difference between a value of a routing metric for the route and a value of the routing metric for a next-best route that avoids the avoidance area group.

By way of further illustration, and referring once again to FIG. 3, avoidance area group D is assigned impact scores ($i_{1D}$, 0, 0, $i_{4D}$), where $i_{1D}$ and $i_{4D}$ are nonzero values, indicating that the first route 202 and the fourth route 306 pass through at least one of the avoidance areas in avoidance area group D, while the second route 302 and the third route 304 do not. Continuing the illustration, avoidance area group C can be assigned impact scores (0, $i_{2C}$, $i_{3C}$, 0) indicating that the second route 302 and the third route 304 pass through at least one of the avoidance areas in avoidance area group C, and the first route 202 and the fourth route 306 do not.

The impact module 124 ultimately assigns an impact score for each of the routes to each of the avoidance groups. The impact module 124 can then compute the initial impact of each avoidance area group as the mean of the individual impact scores assigned to the avoidance area group.

It is to be appreciated that there may be overlap between avoidance area groups such that two or more avoidance area groups can include one or more of the same avoidance areas. In other words, a single avoidance area can be assigned to multiple avoidance area groups, and the impact of the avoidance area on routing metrics can affect the routing metric impact of multiple avoidance area groups. For instance, for the set of routes indicated in the operational area 200 as depicted in FIG. 3, the avoidance area groups A and D share two avoidance areas 216, 218, and the avoidance area groups B and C share two avoidance areas 222, 224.

Furthermore, it can also commonly be the case that two avoidance area groups do not overlap with one another (i.e., do not share any common avoidance areas), but do overlap with a same third avoidance area group. By way of example, if the set of routes used by the grouping module includes a route from the point 214 to the point 312 along the same route as the fourth route 306, a fifth avoidance area group E can be defined by the grouping module, wherein the group E includes only avoidance area 226. In this example, avoidance areas A and E both overlap with avoidance area D, but not with one another. In such cases, the third avoidance area group affects the impact of the other two avoidance area groups through their shared avoidance areas. The other two avoidance area groups also affect one another's impacts on routing metrics transitively by way of their respective influence on the third avoidance area group. Thus, while it may be possible to prioritize resolution of avoidance area groups based upon the naïve initial impacts computed by the impact module 124, these impacts will generally over- or understate the impact of various avoidance area groups by failing to account for direct overlap between avoidance groups or the possibility of transitive effects on the impact of an avoidance area group by other avoidance area groups.

The ranking module 126 addresses this problem by taking into consideration overlap of avoidance areas between avoidance area groups to adjust the initial impacts of the avoidance area groups generated by the impact module 124. In an exemplary embodiment, the ranking module 126 generates an impact ranking of avoidance area groups based upon a recursive evaluation of the impacts of avoidance area groups (e.g., as generated by the grouping module 122) over a graph representation of the avoidance area groups that includes data indicative of overlap between avoidance area groups.

Exemplary operations of the ranking module 126 are now described with respect to the graph construction module 128 and the evaluation module 130. The graph construction module 128 is configured to construct a graph representation of the avoidance area groups identified by the grouping module. The evaluation module 130 is configured to evaluate relative impacts of the avoidance area groups by evaluating a recursive ranking algorithm over the graph representation generated the graph construction module 128.

The graph construction module 128 constructs a graph representation of the avoidance area groups based upon the initial impacts of the avoidance area groups as computed by the impact module 124 and avoidance area overlap between the avoidance area groups. The graph construction module 128 generates a graph that comprises a plurality of vertices and a plurality of edges that each connect a respective pair of vertices in the vertices. The graph includes one vertex for each of the avoidance area groups identified by the grouping module 122. The graph construction module 128 can assign initial weights to the vertices based upon the initial impact values of the corresponding avoidance area groups calculated by the impact module 124. By way of example, a first vertex in the vertices that represents a first avoidance area group can be assigned an initial weight that is equal to the initial impact value of the first avoidance area group. The graph construction module 128 can assign weights to the edges, wherein the weight assigned to an edge in the graph is indicative of an amount of overlap between the avoidance area groups represented by the vertices connected by the edge.

Figure 4:
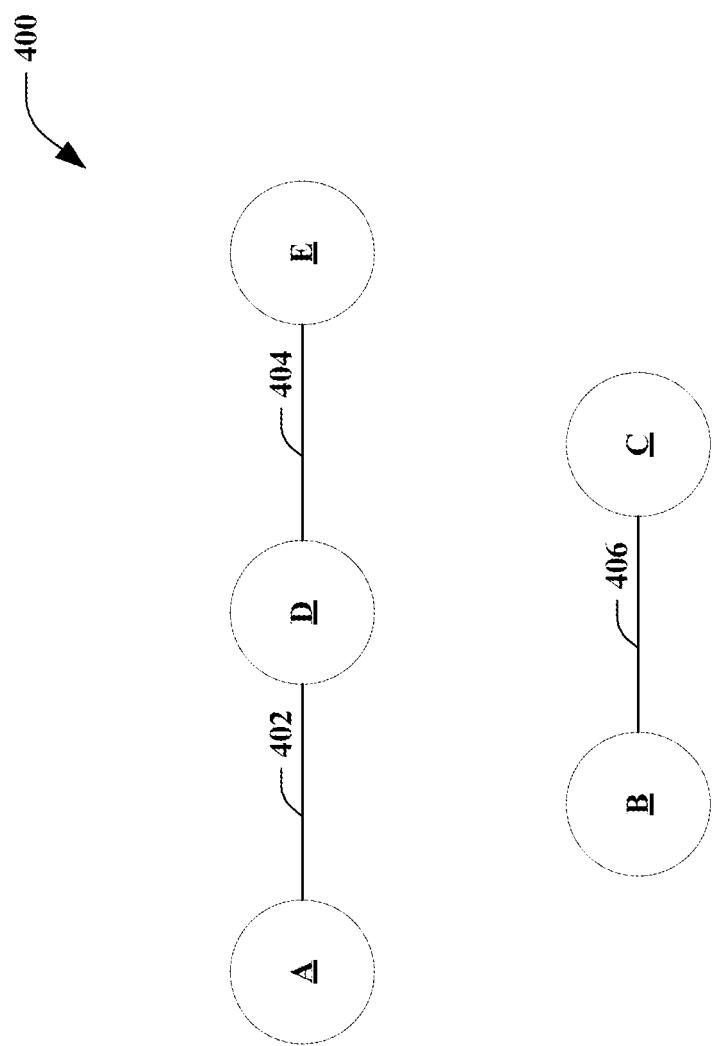
FIG. 4 illustrates an exemplary undirected graph representation of avoidance area groups depicted in FIG. 3.

The graph construction module 128 can construct the graph representation of the avoidance area groups to be an undirected graph or a directed graph. By way of example, and referring now to FIG. 4, an exemplary undirected graph representation 400 of the avoidance area groups A-E depicted in FIG. 3 is illustrated. The graph representation 400 includes vertices A, B, C, D, and E corresponding to the avoidance area groups A-E depicted in FIG. 3. Vertex A is connected to Vertex D by edge 402, indicating that avoidance area groups A and D overlap. Vertex D is further connected to vertex E by edge 404, indicating that avoidance area groups D and E overlap. Vertex C is connected to vertex B by edge 406, indicating that avoidance area groups B and C overlap.

Each of the vertices A-E of the graph representation 400 has a respective weight assigned thereto, each of the respective weights being based upon the initial impacts generated for the avoidance area groups A-E by the impact module 124. Each of the edges 402-406 has a respective weight assigned thereto, the weights being indicative of overlap between the avoidance area groups represented by the vertices A-E. By way of example, the edge 402 can be assigned a weight of 2 indicating that avoidance area groups A and D share two avoidance areas. By way of further example, the edge 404 can be assigned a weight of 1 indicating that the avoidance area groups D and E share a single avoidance area. Still further the edge 406 can be assigned a weight of 2 indicating that the avoidance area groups B and C share two avoidance areas.

Figure 5:
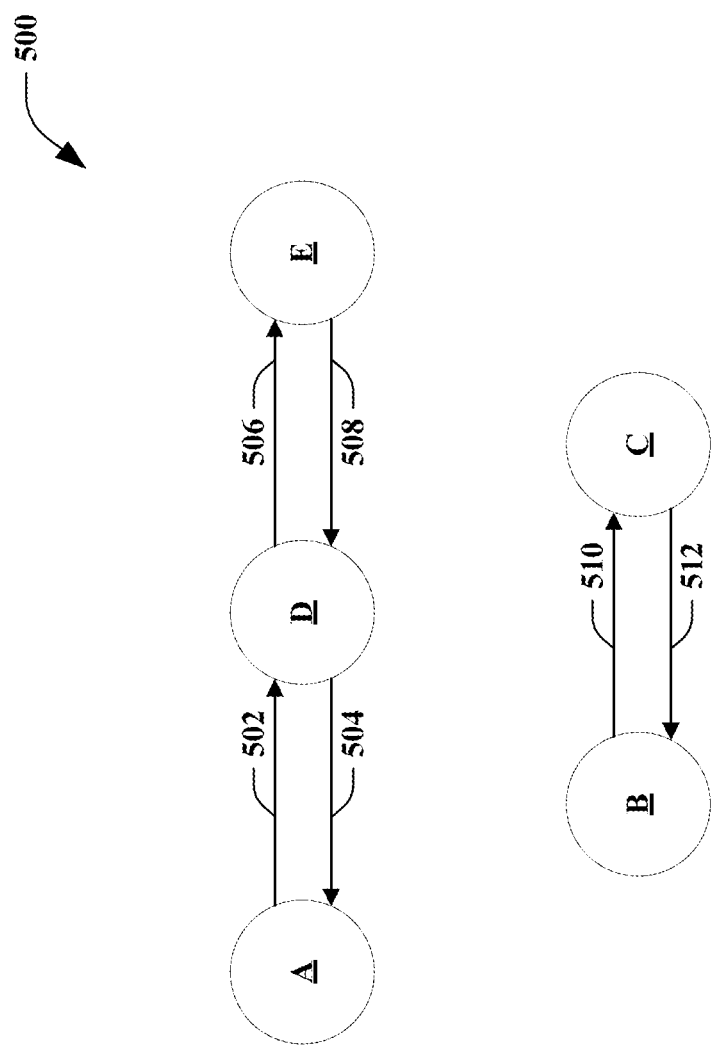
FIG. 5 illustrates an exemplary directed graph representation of avoidance area groups depicted in FIG. 3.

Referring now to FIG. 5, a directed graph representation of the avoidance area groups A-E depicted in FIG. 3 is illustrated. The graph representation 500 is an alternative representation of the avoidance area groups A-E to the graph representation 400. The graph representation 500 includes the same vertices A-E as the graph representation 400 with the same weights. Instead of undirected edges, the graph representation 500 includes directed edges 502-512. The graph 500 includes a directed edge 502 that extends from vertex A to vertex D, a directed edge 504 that extends from vertex D to vertex A, a directed edge 506 that extends from vertex D to vertex E, a directed edge 508 that extends from vertex E to vertex D, a directed edge 510 that extends from vertex B to vertex C, and a directed edge 512 that extends from vertex C to vertex B.

In the directed graph 500, the edges 502-512 are assigned respective weights. The weight of each edge is based upon an amount of overlap between the vertices connected by the edge and a total number of avoidance areas in the avoidance area group represented by the vertex at which the directed edge terminates. In an exemplary embodiment, the weight of an edge in the edges 502-512 can be the number of overlapping avoidance areas between the avoidance area groups divided by the total number of avoidance areas in the avoidance area group represented by the terminal vertex. By way of example, the directed edge 502 from vertex A to vertex D can be assigned a weight 2/3 because avoidance area group A shares two of the three avoidance areas included in avoidance area group D. By way of further example, the directed edge 504 from vertex D to vertex A can be assigned a weight 2/2 because avoidance area group D shares two of the two avoidance areas included in avoidance area group A.

Exemplary embodiments have been described above wherein vertices of a graph are representative of avoidance area groups and edges of the graph are representative of overlap between avoidance area groups. It is to be understood that in other embodiments, vertices of the graph representation can be representative of individual avoidance areas and edges connecting two vertices can indicate that the avoidance areas represented by the vertices belong to at least one same avoidance area group.

Responsive to the graph construction module 128 constructing the graph representation of the avoidance area groups, the evaluation module 130 evaluates a ranking algorithm over the graph to compute a respective rank value for each of the vertices of the graph. The rank value of each vertex in the graph is indicative of a relative impact of the avoidance area groups represented by the vertex on routing metrics for trips through the operational area represented by the HD map 110.

In an exemplary embodiment, the evaluation module 130 computes the rank value for each of the vertices of the graph representation by evaluating a PageRank algorithm over the graph. During execution of the PageRank algorithm, the evaluation module 130 computes a PageRank value for each of the vertices. The evaluation module 130 computes the PageRank values based upon the structure of the graph representation of the avoidance area groups, the weights of the vertices, and the weights of the edges. By executing the PageRank algorithm over the graph representation to generate PageRank values for the vertices, the evaluation module 130 recursively evaluates relative impact of the avoidance area groups, taking into consideration network effects among the avoidance areas and overlap among the avoidance area groups.

The rank value output by the evaluation module 130 for each of the vertices can be or be based upon the respective PageRank value of the vertex that is computed by the evaluation module 130. The evaluation module 130 can then output a ranked listing of avoidance area groups, wherein the ranked listing is based upon the rank values of the vertices corresponding to the avoidance area groups. By way of example, the evaluation module 130 can output a list of avoidance area groups in descending order of rank value, from highest rank value to lowest rank value. Since the ranked listing is based upon the PageRank values calculated by the evaluation module 130, the ranked listing is indicative of the relative impact of the avoidance area groups in the listing when taking into consideration network effects among avoidance areas and overlap among avoidance area groups.

The ranked listing of avoidance area groups generated by the evaluation module 130 can be employed in connection with efficiently resolving avoidance areas. Stated differently, the ranked listing can indicate an order in which avoidance area groups can be resolved to have a greater improvement with respect to trip routing metrics as compared with resolving individual avoidance areas without consideration of network effects among avoidance areas. A system for resolving avoidance areas (e.g., by way of remapping) can employ the ranked listing of the avoidance area groups to dispatch limited avoidance area resolution resources to resolve avoidance areas in an efficient order.

Figure 6:
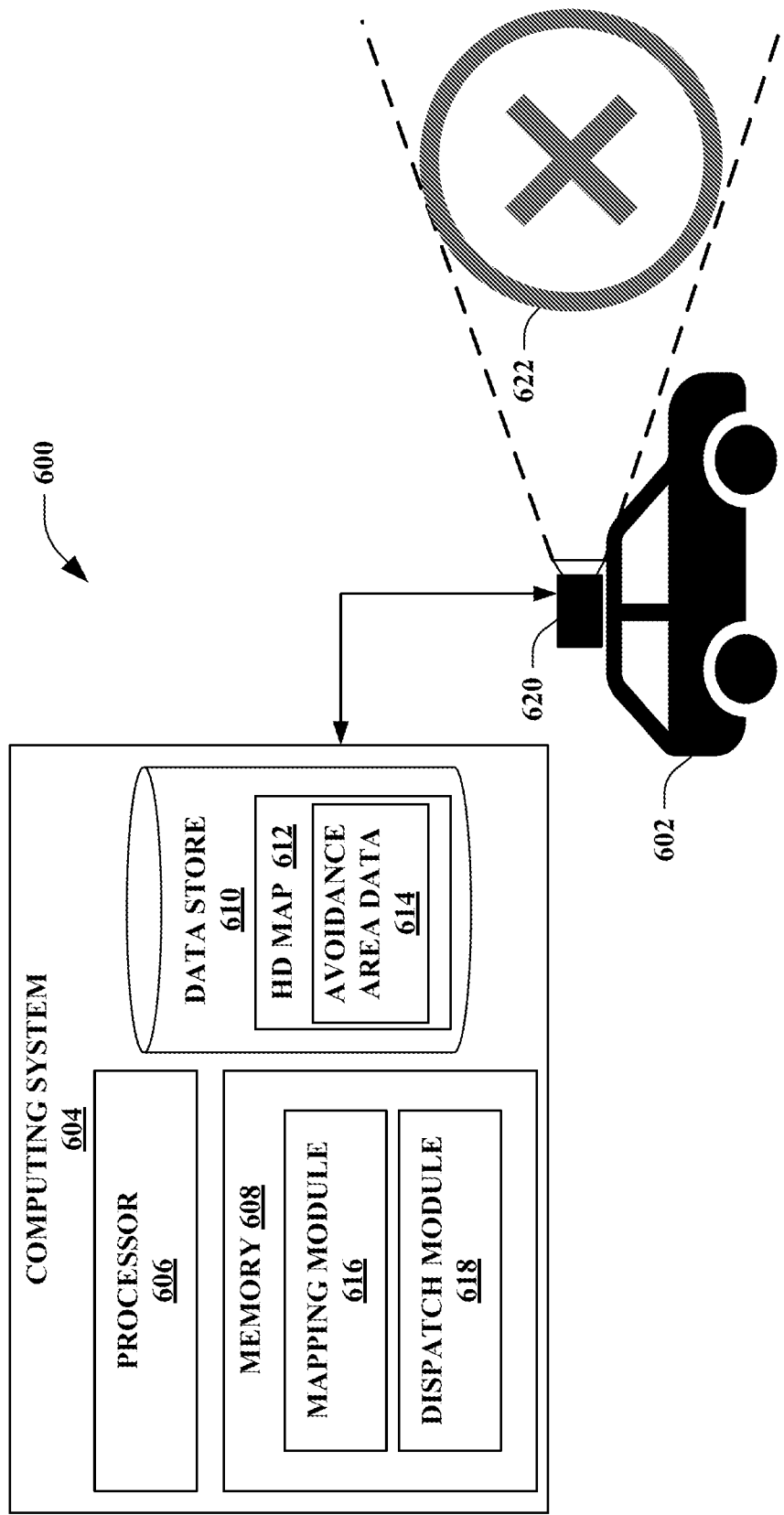
FIG. 6 depicts an exemplary system for remapping avoidance areas.

With reference now to FIG. 6, an exemplary environment 600 is illustrated that includes an autonomous vehicle 602 in communication with a computing system 604. The computing system 604 comprises a processor 606, memory 608, and a data store 610. The data store 610 comprises an HD map 612 (e.g., the HD map 110) that is representative of an operational area of the autonomous vehicle 602. The HD map 612 includes avoidance area data 614 (e.g., the avoidance area data 112). The memory 608 comprises a mapping module 616 and a dispatch module 618. The mapping module 616 is configured to update the avoidance area data

614 based upon data received by the computing system 604 from autonomous vehicles operating in the operational area, as will be described in greater detail below. The dispatch module 618 is configured to dispatch an autonomous mapping vehicle to an avoidance area in the avoidance area data 614 in order to resolve the avoidance area.

The autonomous vehicle 602 includes a sensor system 620 such as a camera sensor system or a lidar sensor system that captures a field of view from the location of the autonomous vehicle 602. When the autonomous vehicle 602 identifies an inconsistency with map data currently stored at the autonomous vehicle 602, the inconsistency is communicated to the computing system 604. The mapping module 616 updates the avoidance area data 614 to include an avoidance area 622 at a location of the inconsistency. The avoidance area data 614 therefore specifies an avoidance area 622 through which the autonomous vehicle 602 can no longer be routed until the avoidance area 622 is remapped and updated in the avoidance area data 614.

The dispatch module 618 of the computing system 602 can be configured to transmit a dispatch instruction to the autonomous vehicle 602 to cause the autonomous vehicle 602 to perform a mapping operation with respect to the avoidance area. The mapping operation can include collection of more sensor data with respect to the avoidance area 622 (e.g., by way of the sensor system 612 included on the autonomous vehicle 602) in order to allow the HD map 612 to be updated with sufficiently detailed data to allow autonomous vehicles to be routed through the avoidance area 622. Responsive to receipt of sensor data pertaining to the avoidance area 622 from the autonomous vehicle 602, the mapping module 616 can update the HD map 612 and resolve the avoidance area 622 (e.g., by removing the avoidance area 622 from the avoidance area data 614).

In exemplary embodiments, the dispatch module 618 dispatches the autonomous vehicle 602 to an avoidance area in the avoidance area data 614 based upon a ranked listing of avoidance area groups (e.g., as generated by the evaluation module 130 of the computing system 100). By way of example, and not limitation, the computing system 604 can receive a ranked listing of avoidance area groups from the computing system 100, wherein the ranked listing of avoidance area groups is generated based upon avoidance areas included in the avoidance area data 614. The dispatch module 618 can be configured to dispatch the autonomous vehicle 602 to avoidance area groups in an order indicated in the ranked listing, in order to facilitate efficient resolution of avoidance areas in the avoidance area data 614. In other exemplary embodiments, the computing system 100 can further include the mapping module 616 and the dispatching module 618, and can be configured to perform the various acts set forth above with respect to the computing system 604.

From the foregoing, it is to be understood that as avoidance areas in an operational area are identified and resolved, it may be desirable to update a ranking of avoidance area groups for resolution. Accordingly, and with reference once again to FIG. 1, the avoidance area analysis system 116 can periodically output an updated ranking of avoidance area groups based upon the avoidance area data 112. In other embodiments, the avoidance area analysis system 116 can output an updated ranking of avoidance area groups based upon the avoidance area data 112 being updated to reflect addition or resolution of an avoidance area. Still further, the avoidance area analysis system 116 can be configured to track rank values for avoidance area groups over time. By way of example, the avoidance area analysis system 116 can maintain a list of avoidance area groups in the avoidance area data 112, wherein the list comprises tuples that each include an avoidance area group identifier, an impact rank value (e.g., a PageRank value), and a timestamp indicating a date and time at which the impact rank value was computed.

Figure 7:
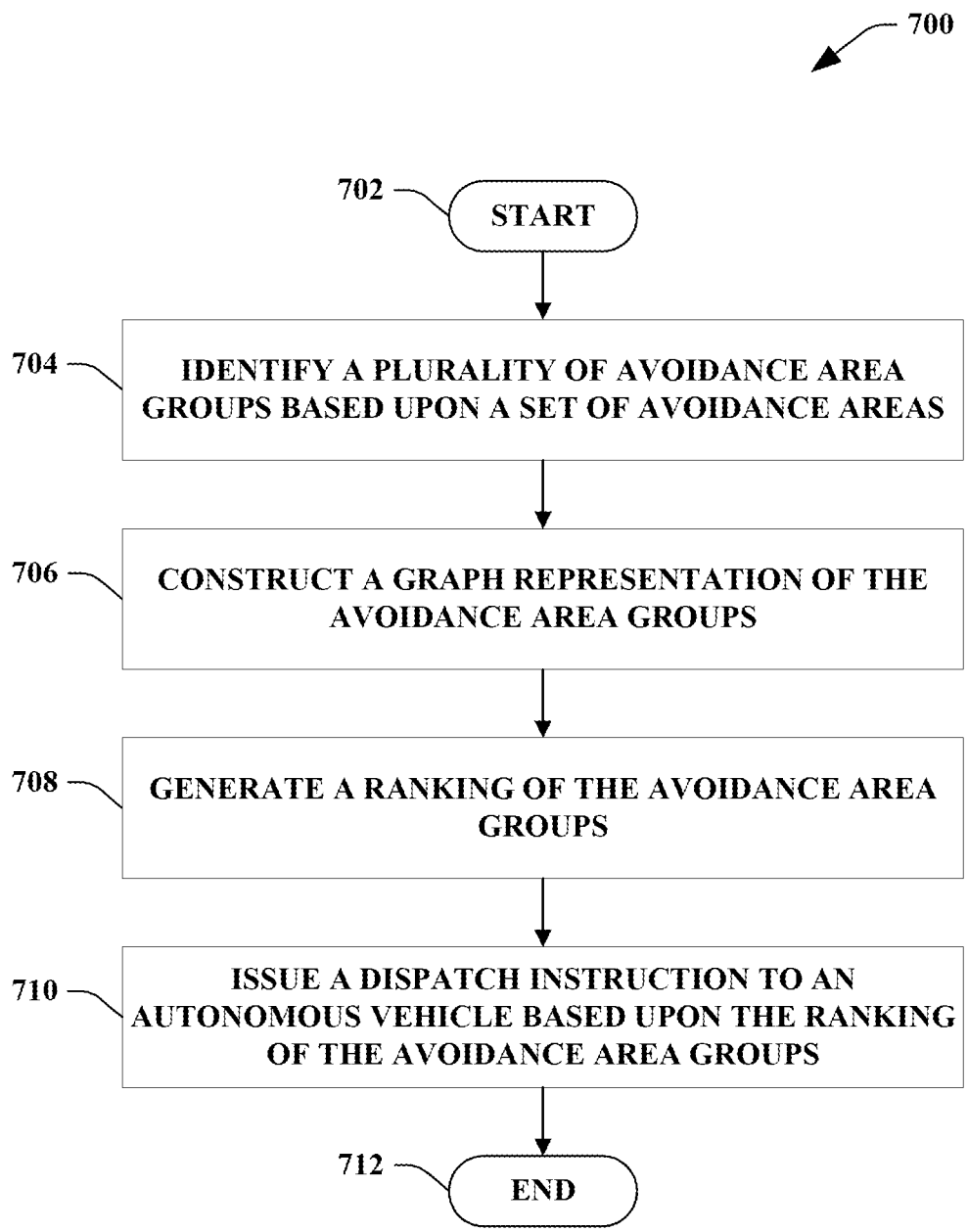
FIG. 7 is a flow diagram illustrating an exemplary methodology for causing an autonomous vehicle to remap avoidance areas in an order based on their relative impact on trip routing metrics.

FIG. 7 illustrates an exemplary methodology for analyzing network effects of avoidance areas on routing of autonomous vehicles and identifying efficient orders in which to resolve avoidance areas to improve routing. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for analyzing network effects of avoidance areas on routing and resolving avoidance areas is illustrated. The methodology 700 starts at 702, and at 704, a plurality of avoidance area groups are identified based upon a set of avoidance areas. By way of example, the avoidance area groups can be identified based upon a set of routes through an operational area that includes the avoidance areas, wherein an avoidance area group includes avoidance areas that lie along a same route in the set of routes. At 706, a graph representation of the avoidance area groups identified at 704 is constructed. The graph representation includes vertices that are representative of the avoidance area groups and edges that are representative of overlap between avoidance area groups whose vertices are connected by an edge.

At 708, a ranking of the avoidance area groups is generated based upon the graph representation. In an exemplary embodiment, the ranking of the avoidance area groups can be generated by executing a PageRank algorithm over the graph representation. The PageRank algorithm computes PageRank scores for each of the vertices of the graph, which PageRank scores can be assigned to the corresponding avoidance area groups represented by the vertices. The avoidance area groups can then be ranked in descending order of PageRank score. The ranking of the avoidance area groups is generally indicative of the relative impact of the avoidance area groups on routing metrics for a set of routes through the operational area to which the avoidance area groups pertain.

At 710 a dispatch instruction can be issued to an autonomous vehicle based upon the ranking of the avoidance area groups. The dispatch instruction is configured to cause the autonomous vehicle to navigate to an avoidance area included in one of the avoidance area groups and to perform a mapping operation with respect to the avoidance area. In an exemplary embodiment, the dispatch instruction can be issued to the autonomous vehicle to cause the autonomous vehicle to remap avoidance area groups in the order of the ranking generated at 708. The autonomous vehicle can therefore be dispatched to remap avoidance area groups that have a greater impact on routing metrics for trips through the operational area before remapping avoidance area groups that have a lesser impact. The methodology 700 completes at 712.

Figure 8:
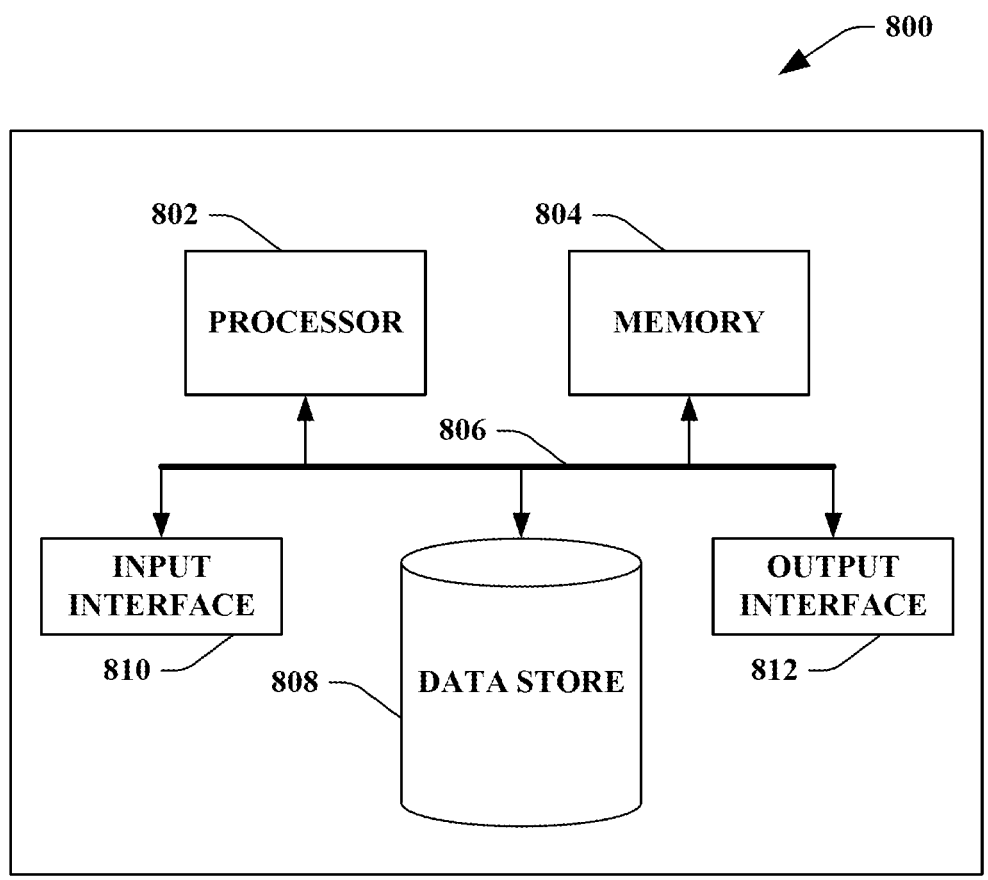
FIG. 8 illustrates an exemplary computing system.

Referring now to FIG. 8, a high-level illustration of an exemplary computing device 800 that can be used in accordance with the systems and methodologies disclosed herein is illustrated. For instance, the computing device 800 may be or include the computing systems 100 or 304. The computing device 800 includes at least one processor 802 that executes instructions that are stored in a memory 804. The instructions may be, for instance, instructions for implementing functionality described as being carried out by one or more modules and systems discussed above or instructions for implementing one or more of the methods described above. In addition to storing executable instructions, the memory 804 may also store location information, distance information, direction information, avoidance area data, etc.

The computing device 800 additionally includes a data store 808 that is accessible by the processor 802 by way of the system bus 806. The data store 808 may include executable instructions, map data, avoidance area data, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the computing system 100 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   at least one processor; and
   memory that stores computer-executable instructions that, when executed by the at least one processor, cause the at least one processor to perform acts comprising:
   receiving data indicative of a plurality of avoidance area groups, each of the avoidance area groups comprising at least one avoidance area that specifies a geographic area through which autonomous vehicles (AVs) are prohibited from being routed, wherein a first avoidance area group in the avoidance area groups shares at least one avoidance area with a second avoidance area group in the avoidance area groups, wherein a first avoidance area and a second avoidance area are assigned to a same group based upon the first avoidance area and the second avoidance area being with a threshold distance of one another;
   generating a ranking of the avoidance area groups based upon a recursive evaluation of the impacts of the avoidance area groups on routing metrics for a set of routes through an operational area of the AVs, the ranking indicative of relative impacts of the avoidance area groups on the routing metrics; and
   issuing a dispatch instruction to an AV based upon the ranking of the avoidance area groups, the dispatch instruction configured to cause the AV to navigate to an avoidance area and to perform a mapping operation in the avoidance area, wherein the avoidance area is included in an avoidance area group in the plurality of avoidance area groups.

2. The computing system of claim 1, wherein the recursive evaluation of the impacts of the avoidance area groups on the routing metrics is based upon the first avoidance area group sharing the at least one avoidance area with the second avoidance area group.

3. The computing system of claim 1, the acts further comprising:

responsive to receiving sensor data pertaining to the avoidance area from the AV, updating a map of the operational area of the AVs to indicate that the AVs are no longer prohibited from being routed through the avoidance area.

4. The computing system of claim 3, the acts further comprising:
responsive to updating the map to indicate that the AVs are no longer prohibited from being routed through the avoidance area, generating a ranking of a second plurality of avoidance area groups that fails to include the avoidance area.

5. The computing system of claim 1, wherein the recursive evaluation is based upon a graph representation of the plurality of avoidance area groups, the graph comprising:
vertices, wherein each vertex is representative of a different avoidance area group in the avoidance area groups; and
edges, each edge in the edges connecting two respective vertices in the vertices, each edge in the edges based upon a measure of overlap between avoidance area groups represented by the vertices connected by the edge.

6. The computing system of claim 5, wherein the recursive evaluation is based upon an initial set of weights assigned to the vertices.

7. The computing system of claim 6, wherein a first initial weight is assigned to a first vertex in the vertices based upon a number of routes in the set of routes that pass through an avoidance area group in the set of avoidance area groups that is represented by the first vertex.

8. The computing system of claim 5, wherein the recursive evaluation comprises executing a PageRank algorithm over the graph representation.

9. The computing system of claim 1, wherein the first avoidance area and the second avoidance area are further assigned to the same avoidance area group based upon the first avoidance area and the second avoidance area being included along a same route in the set of routes or a second set of routes.

10. A method for prioritizing resolution of avoidance areas in an operational area of an autonomous vehicle, the method comprising:
receiving data indicative of a plurality of avoidance area groups, each of the avoidance area groups comprising at least one avoidance area that specifies a geographic area through which autonomous vehicles (AVs) are prohibited from being routed, wherein a first avoidance area group in the avoidance area groups shares at least one avoidance area with a second avoidance area group in the avoidance area groups, wherein a first avoidance area and a second avoidance area are assigned to a same avoidance area group based upon the first avoidance area and the second avoidance area being included along a same route in a set of routes or a second set of routes;
generating a ranking of the avoidance area groups based upon a recursive evaluation of the impacts of the avoidance area groups on routing metrics for the set of routes through an operational area of the AVs, the ranking indicative of relative impacts of the avoidance area groups on the routing metrics, the recursive evaluation of the impacts of the avoidance area groups on the routing metrics based upon the first avoidance area group sharing the at least one avoidance area with the second avoidance area group; and
issuing a dispatch instruction to an AV based upon the ranking of the avoidance area groups, the dispatch instruction configured to cause the AV to navigate to an avoidance area and to perform a mapping operation in the avoidance area, wherein the avoidance area is included in an avoidance area group in the plurality of avoidance area groups.

11. The method of claim 10, wherein the recursive evaluation is based upon a graph representation of the plurality of avoidance area groups, the graph comprising:
vertices, wherein each vertex is representative of a different avoidance area group in the avoidance area groups; and
a first edge connecting a first vertex and a second vertex in the vertices, the first vertex representative of the first avoidance area group, the second vertex representative of the second avoidance area group, the first edge being assigned a weight indicative of a number of shared avoidance areas between the first avoidance area group and the second avoidance area group.

12. The method of claim 11, wherein the recursive evaluation comprises executing a PageRank algorithm over the graph representation.

13. The method of claim 10, further comprising:
responsive to receipt of sensor data from the AV, the sensor data generated by the AV in connection with performing the mapping operation, updating a map of the operational area of the AVs to remove the avoidance area from the map.

14. The method of claim 10, wherein the first avoidance area and the second avoidance area are further assigned to the same avoidance area group based upon the first avoidance area and the second avoidance area being with a threshold distance of one another.

15. An autonomous vehicle (AV), comprising:
a motor;
a steering system;
a braking system; and
a computing system configured to perform acts comprising:
receiving a dispatch instruction from a server computing device in communication with the AV, the dispatch instruction indicating an avoidance area in an operational area of the AV, the dispatch instruction based upon a ranking of a plurality of avoidance area groups, wherein a first avoidance area group in the avoidance area groups includes the avoidance area, the ranking based upon a recursive evaluation of the impacts of the avoidance area groups on routing metrics for a set of routes through the operational area of the AV, the ranking indicative of relative impacts of the avoidance area groups on the routing metrics, wherein a first avoidance area and a second avoidance area are assigned to a same group area group based upon the first avoidance area and the second avoidance area being within a threshold distance of one another;
controlling at least one of the motor, the steering system, or the braking system to cause the AV to navigate to the avoidance area; and
causing the AV to perform a mapping operation in the avoidance area.

16. The AV of claim 15, further comprising a sensor system, wherein performing the mapping operation comprises causing the sensor system to output sensor data pertaining to the avoidance area.

17. The AV of claim 16, wherein the acts further comprise transmitting the sensor data to the server computing device, wherein transmitting the sensor data to the server computing device causes the server computing device to update a map of the operational area of the AV to no longer include the avoidance area.

18. The AV of claim 16, wherein the sensor system comprises at least one of a camera or a lidar sensor system.

19. The AV of claim 15, further comprising:
a sensor system; and
a data store that stores a first instance of a map of the operational area of the AV, wherein the acts further comprise:
responsive to detecting an inconsistency between sensor data output by the sensor system and the map of the operational area of the AV, outputting an indication of the inconsistency to the server computing device, the indication of the inconsistency configured to cause the server computing device to update a second instance of the map of the operational area stored at the server computing device to include a second avoidance area at a location of the inconsistency.

20. The AV of claim 15, wherein the first avoidance area and the second avoidance area are further assigned to the same avoidance area group based upon the first avoidance area and the second avoidance area being included along a same route in the set of routes or a second set of routes.

* * * * *